(12) United States Patent
Matson et al.

(10) Patent No.: US 7,070,740 B1
(45) Date of Patent: Jul. 4, 2006

(54) METHOD AND APPARATUS FOR PROCESSING BIOMOLECULE ARRAYS

(75) Inventors: Robert S. Matson, Orange, CA (US); Daniel G. Morrow, Redwood City, CA (US); Karen E. Lowe, Mill Creek, WA (US)

(73) Assignee: Beckman Coulter, Inc., Fullerton, CA (US)

( * ) Notice: Subject to any disclaimer, the term of this patent is extended or adjusted under 35 U.S.C. 154(b) by 0 days.

(21) Appl. No.: 09/675,020

(22) Filed: Sep. 28, 2000

(51) Int. Cl.
*B01L 9/00* (2006.01)

(52) U.S. Cl. .............. 422/104; 435/288.3; 435/288.5; 435/305.1; 422/100; 422/101; 422/102; 422/103; 366/139; 366/275; 436/518

(58) Field of Classification Search ............ 435/288.3, 435/288.5, 305.1; 422/101, 102, 103, 104, 422/105; 436/518
See application file for complete search history.

(56) References Cited

U.S. PATENT DOCUMENTS

| | | | |
|---|---|---|---|
| 4,676,656 A | 6/1987 | Cook et al. ............ | 366/142 |
| 4,948,564 A | 8/1990 | Root et al. ............ | 422/101 |
| 5,516,490 A * | 5/1996 | Sanadi ............ | 422/101 |
| 5,544,218 A | 8/1996 | Turner et al. ............ | 378/208 |
| 5,554,536 A * | 9/1996 | Rising ............ | 435/305 |
| 5,858,309 A * | 1/1999 | Mathus et al. ............ | 422/102 |
| 5,882,595 A * | 3/1999 | La Motte ............ | 422/65 |
| 5,888,830 A * | 3/1999 | Mohan et al. ............ | 436/174 |
| 5,948,363 A * | 9/1999 | Gaillard ............ | 422/102 |
| 5,985,214 A * | 11/1999 | Stylli et al. ............ | 422/65 |
| 6,083,763 A | 7/2000 | Balch ............ | 436/518 |
| 6,103,169 A | 8/2000 | Mathus et al. ............ | 264/266 |
| 6,159,368 A * | 12/2000 | Moring et al. ............ | 210/321.75 |
| 6,232,114 B1 * | 5/2001 | Coassin et al. ............ | 435/288.4 |
| 6,309,828 B1 * | 10/2001 | Schleifer ............ | 435/6 |

FOREIGN PATENT DOCUMENTS

| | | |
|---|---|---|
| WO | WO86/07288 | 12/1986 |
| WO | WO93/17126 | 9/1993 |
| WO | WO 98/29736 | 7/1998 |

OTHER PUBLICATIONS

"Public Disclosures Surrounding Patent Application," Robert Matson, list of slides and oral presentations in which the slides were shown, Mar. 28, 2001.

"Advances in Automated DNA Array Processing," Robert S. Matson, notes from oral presentation, V. International Symposium on Mutations in the Human Genome, Vicoforte, Cuneo, Italy, May 13-16, 1999.

(Continued)

*Primary Examiner*—Long V. Le
*Assistant Examiner*—Deborah A. Davis
(74) *Attorney, Agent, or Firm*—Hogan & Hartson, LLP.

(57) ABSTRACT

A microarray assay system using an array-of-arrays plate mounted on the top surface of a vacuum fixture, and an automatic handling system that handles the plate and fixture assembly. The $A^2$ plate includes a tray formed of a flexible material and a rigid frame for mounting on the fixture. The fixture has a plurality of orifices opening at the top surface and connected to a vacuum source to create a negative pressure to hold the flexible plate against the top surface of the fixture. The automatic handling systems that can be used with the plate and fixture assembly include a microarray printing machine, liquid handling robot, hybridization and incubation devices, and microarray imaging devices.

32 Claims, 13 Drawing Sheets

OTHER PUBLICATIONS

Advances in Automated DNA Processing, Robert S. Matson, notes from oral presentation, IBC's Annual Conference on Sample Preparation, San Francisco, California, Jun. 25-25, 1999.

"Approaches to Automated DNA Array Processing," Robert S. Matson, notes from oral presentation, IBC's 6th Annual Biochip Technologies Conference, Berkeley, California, Nov. 2-5, 1999.

"Automated Solutions for DNA Array Processing (8)," Robert S. Matson, notes from oral presentation, LabAutomation2000, Palm Springs, California, Jan. 22-26, 2000.

"Multiplexed Molecular Profiling (MMP) Assays for High-Throughput measurement of Gene Expression," Ralph Martel et al., white paper, SIDDCO, Inc. (Systems Integration Drug Discovery Company), Tucson, Arizona, undated.

"High-Throughput Microarray-Based Enzyme-Linked Immunosorbent Assay (ELISA)," L.G. Mendoza et al., *Bio Techniques*, vol. 27, No. 4 (1999), pp. 778-788.

* cited by examiner

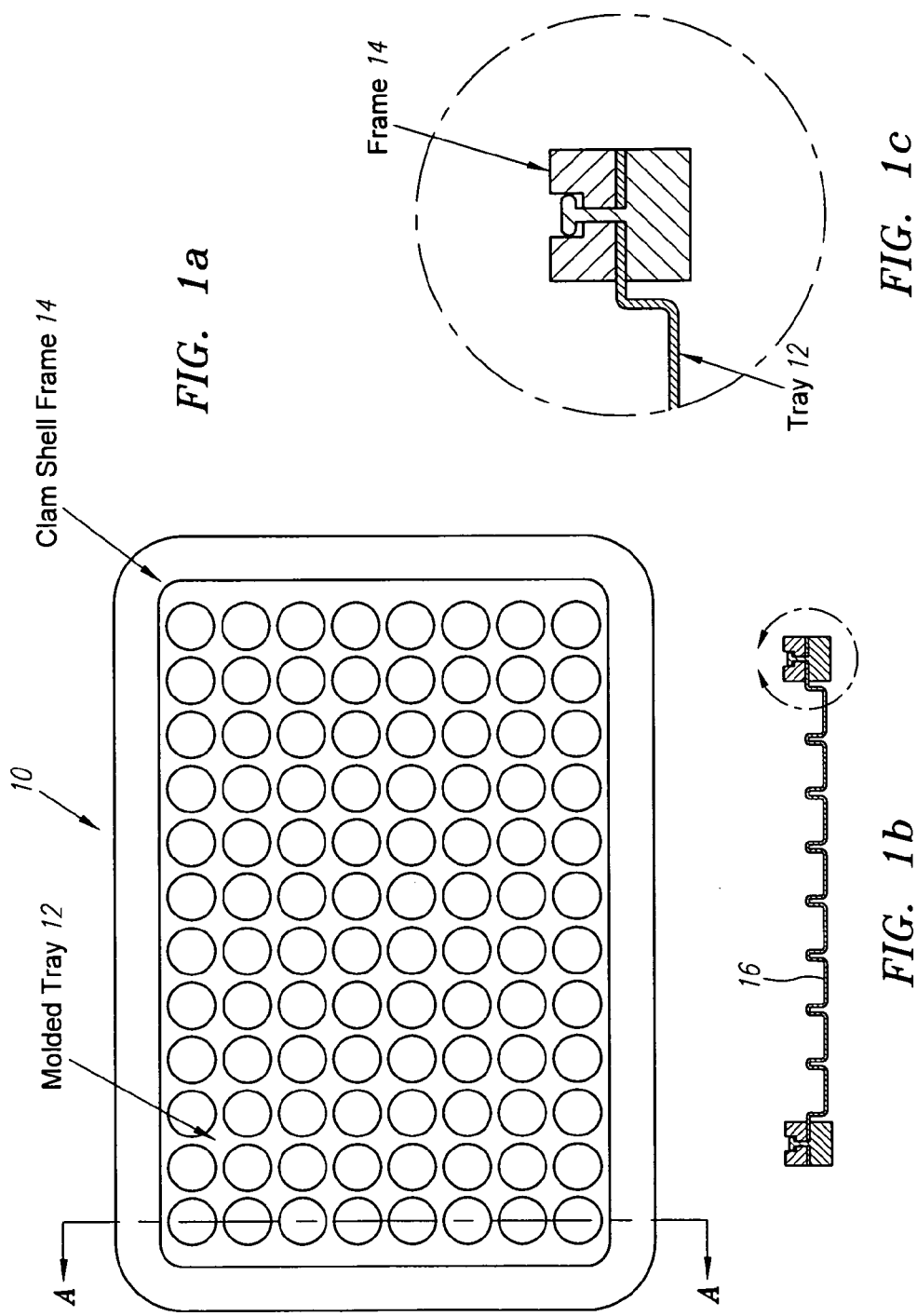

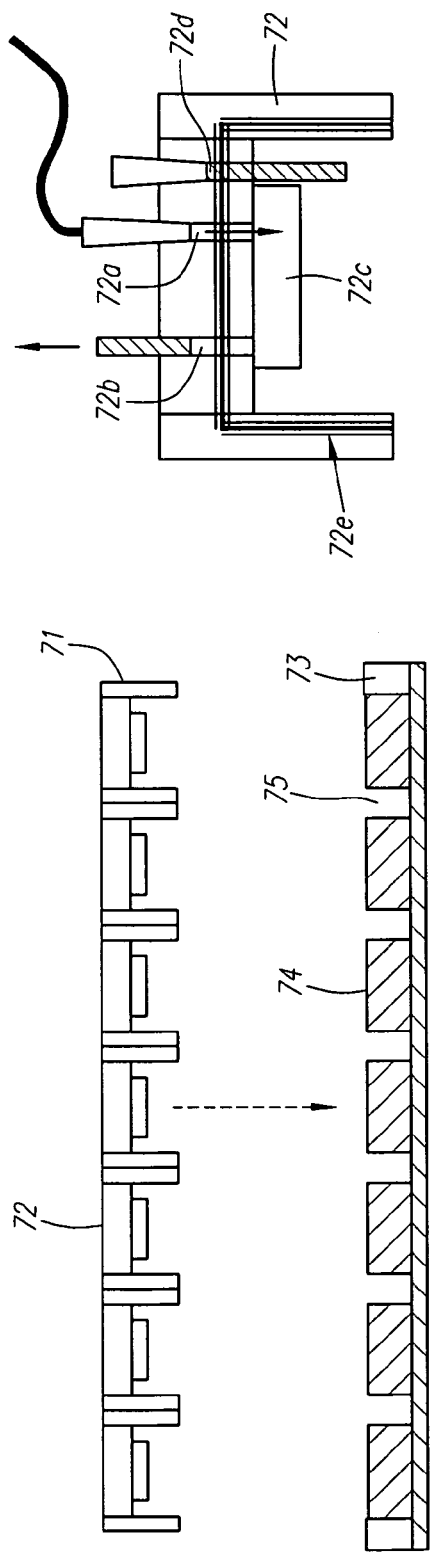
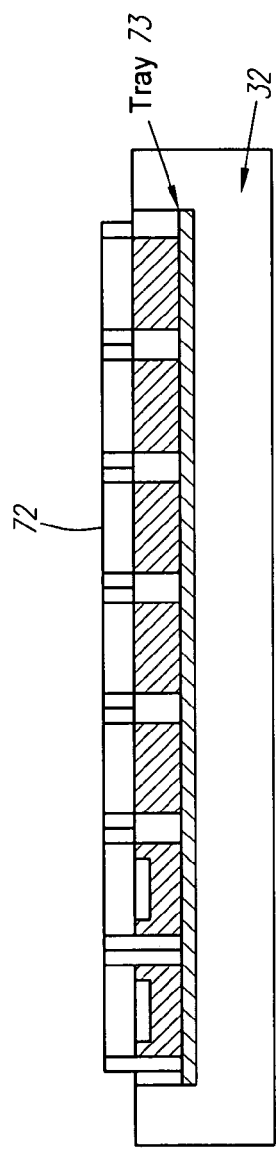
FIG. 7a
FIG. 7b
FIG. 7c

METHOD AND APPARATUS FOR PROCESSING BIOMOLECULE ARRAYS

BACKGROUND OF THE INVENTION

1. Field of the Invention

This invention relates to device and apparatus for processing biomolecule arrays, and in particular, to an "array of arrays" microplate and an automated processing system. The invention is applicable to DNA diagnostics, mutation screening, gene expression monitoring, protein analysis, cell-based assays and other applications using a robotics workstation.

2. Description of the Related Art

Microarrays such as DNA, oligo, and protein microarrays are becoming a standard tool for monitoring changes in gene expression. This technique has found rapidly growing use in many molecular biology laboratories. A variety of structural and functional genomic characteristics can be studied in addition to expression or transcription. In a Microarrays assay from hundreds to tens of thousands of probes are attached to a substrate in an array form, and sample solutions are incubated on these arrays. By using known sequence of the probe (oligo or cDNA) at each spot on the array, the specificity inherent in hybridization gives indication as to which genes are present in the sample. Many samples are often needed to track the progress of a disease, or to identify genetic variation across hundreds of people. This requires a careful comparison of data of different arrays.

Currently, the majority of DNA arrays are formed on glass microscope slides. In a typical process. A robotic "spotter" is used to deposit small amounts of fluids, containing the probes onto a glass slide to form an array. Approximately 10,000 spots can be arrayed onto a glass slide. Next, a solution of targets is applied on the slide, typically by hand. After the slide is then placed in an incubator/mixer for several hours the fluorescent signals from the bound targets are imaged using a laser and a photomultiplier tube. This method, however, suffers from low throughput and poor data quality and reproducibility.

An alternative to using glass slides would be to use existing molded polymer titer plates, where arrays or printed into the wells. The microtiter plate is a well-known tool; the attachment of biomolecules within the microwell either as single elements (e.g., ELISA plates) or in the form of arrays (e.g., Genometrix, WO 98/29736) is also well known. The reading of arrays, however, is difficult in conventional microwells without the use of expensive equipment. There are also limitations in terms of field of focus and uniform lighting of the bottom of the well using conventional microtiter plates. In addition, the non-symmetrical design of these plates (solid bottom with open topped wells) results in molded parts that warp due to differential thermal expansion. As a result, conventional molded titer plates often fail to meet flatness criterion required for array applications. For example, for accurate dispensing of nanoliter amounts of fluids using pin printers, it is critical that the substrate is flat within 10% of the vertical travel of the pin. If the vertical travel is 0.06 inches, then the flatness must be within 0.006 inches, which is often difficult to meet by molded titer plates. Further, when the plates are heated, warp also creates variable air gaps between the wells and the heating fixture on which the plate is placed. These air gaps lead to variable thermal resistance from well to well, which leads to difficulties in controlling incubation or hybridization temperature from one array to another.

SUMMARY OF THE INVENTION

Given the wide acceptance of "96 head" liquid handling robots and the relative ability to adapt the hybridization process to these robots, there is a need for a high-throughput device that allows microarrays to be processed on robots, and that produces high quality data.

Accordingly, the present invention is directed to a microarray assay method and apparatus that substantially obviate one or more of the problems due to limitations and disadvantages of the related art.

An object of the present invention is to provide an array-of-array microplate and a fixture that cooperates therewith for automated handling of microarray assays.

To achieve these and other advantages and in accordance with the purpose of the present invention, as embodied and broadly described, the present invention provides a microplate for a microarray assay device comprising a tray formed of a flexible material. The tray has a plurality of discrete wells formed therein and a plurality of barriers formed between the wells to restrict fluid cross-flow between the wells. The surface of the wells is activated for immobilization of biorecognition materials such as biomolecules, cells or cellular components. The present invention provides another microplate where the tray has a peripheral depression surrounding an array formation area.

In another aspect, the present invention provides a vacuum fixture for cooperating with the microplate wherein the frame of the microplate is adapted for mounting the microplate on top of the vacuum fixture so that the flexible tray is supported on the top surface of the vacuum fixture. The vacuum fixture has an interior chamber connectable to a vacuum source and a plurality of orifices connected to the interior chamber and opening at the top surface at locations corresponding to the microarray formation areas of the tray when the microplate is mounted on the top surface of the vacuum fixture via the rigid frame. A negative pressure generated in the interior chamber holds the flexible tray firmed against the top surface of the vacuum fixture.

In another aspect, the present invention provides a microarray assay method, including: providing a microplate having a flexible tray and a plurality of microarray formation areas on its surface; mounting the microplate on a top surface of a vacuum fixture, the vacuum fixture having a plurality of orifices connected to a vacuum source and opening at the top surface of the vacuum fixture at location corresponding to the microarray formation areas of the tray; generating a negative pressure in the orifices to hold the tray firmly against the top surface of the fixture; and while holding the tray firmly against the top surface of the fixture, performing at least one function selected from a group consisting of: printing a microarray of biorecognition materials in a microarray formation area, adding a sample to a microarray formation area, controlling the temperature of any sample in the tray, and imaging a microarray formation area.

The present invention provides another microarray assay method including providing a microplate having a flexible tray and a plurality of microarray formation areas on its surface; mounting the microplate on a top surface of a vacuum fixture, the vacuum fixture having a plurality of orifices connected to a vacuum source and opening at the top surface of the vacuum fixture at location corresponding to the microarray formation areas of the tray; and generating alternating positive and negative pressures in the orifices to move portions of the tray corresponding to the microarray formation area up and down to mix any sample contained therein.

The microarray plate and the vacuum fixture form a type of titer plate for use with liquid handling robots. The plate and the fixture provide high-throughput array processing, and allow for flat printing surfaces and low well-to-well temperature variations during thermal incubation. The system allows for parallel processing of microarrays in a microtiter plate footprint.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

FIGS. 1(a), 1(b) and 1(c) illustrate an array-of-arrays plate ($A^2$ plate) according to an embodiment of the present invention. FIG. 1(a) is a top plan view of the plate; FIG. 1(b) is a cross-sectional view of the plate along the line A–A' of FIG. 1(a); and FIG. 1(c) is a detailed cross-sectional view of a part of the plate.

FIG. 2(a) is a top plan view of the plate; and FIG. 2(b) is a cross-sectional view along the line B–B' of FIG. 2(a).

FIGS. 7(a), 7(b) and 7(c) illustrate an $A^2$ plate lid according to an embodiment of the present invention.

DETAILED DESCRIPTION OF THE PREFERRED EMBODIMENTS

Figure 2A:
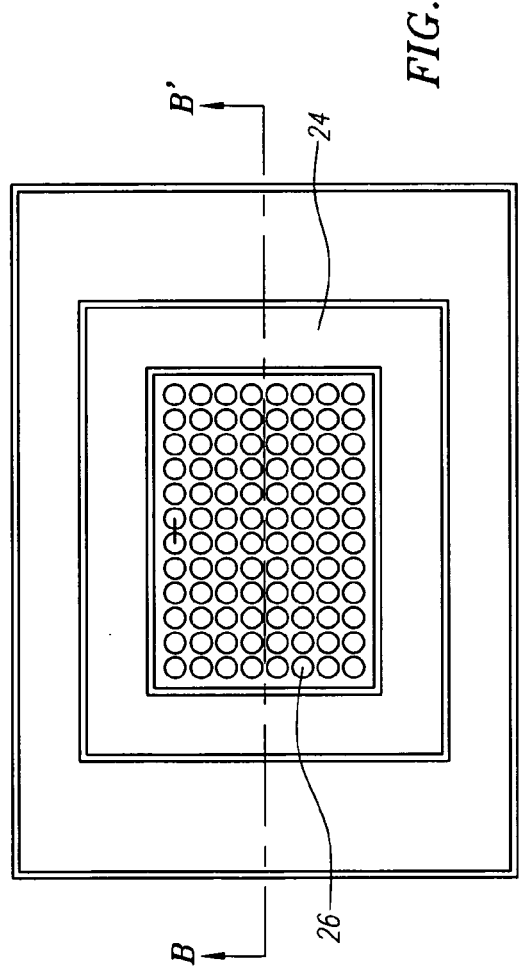
FIGS. 2(a) and 2(b) illustrate an $A^2$ plate according to another embodiment of the present invention.

An array-of-arrays microplate ("$A^2$ plate") assay system according to the present invention employs an $A^2$ plate in conjunction with devices for microarray printing, liquid handling, hybridization and other processes, and necessary fixture apparatus for adapting the $A^2$ plate to the above devices. The $A^2$ plate is a device comprised of multiple wells, where the wells are discrete areas separated by barriers such as walls, hydrophobic patches, troughs, gaskets or pedestals, etc. that restrict fluid cross-flow between the discrete areas. Within each well may be formed an array of a immobilized elements, where an element is defined as a discrete, physical location of biorecognition materials. The number of elements in an array may be from 1 to 1536 or more, and preferably 16 to 400. The size of the arrays may be the same or different in different wells. The elements in each array may contain the same or different biorecognition materials.

Biorecognition materials generally refer to materials that interact with target materials in the sample to recognize the targets. Biorecognition materials that may be immobilized on the plate include biomolecules such as DNA and protein, cells, and cellular components such as membrane receptors, biomolecule recognition sites, sub-organelles and other structural features. The biorecognition materials are attached to the surface of the well by covalent, non-covalent or any other suitable means, such as affinity interaction with biorecognition molecules attached to the site. For example, a covalent attachment using acyl fluoride chemistry may be employed. Cells or cellular components may be attached to the wells via cell surface constituents such as proteins, carbohydrates, or other biomolecules or linkers. The immobilized biorecognition materials may be labeled by a variety of means, such as enzyme conjugates, fluorescent, chemiluminescent, luminescent, radioactive, near infra-red molecules, energy-transfer reagents, enzyme substrates or the like. The elements within each well or within each plate may be labeled with the same or different labels. The samples to be added to the wells may also be labeled with one or more labels. The sample may also be a mixture of different biological samples, each being labeled or unlabeled.

The $A^2$ plate is preferably formed of plastic materials that can be surface-treated for immobilization of the biorecognition materials. Preferred materials include thermoplastics such as polypropylene, polyethylene and/or their copolymer blends, although other materials and their combinations such as polymeric foams, gels, glasses or ceramics maybe used so long as they can be formed into wells or barriers and surface-activated. Other than direct surface treatment of the plastic, an activated insert may be placed into the well, such as a disk, screen, foam or fitted material. Alternatively, adsorption of an activated coating on the well may be employed. The bulk plastics are preferably chemically inert and characterized by low nonspecific adsorption of biomolecules and other biorecognition materials, and low intrinsic or auto-fluorescence. It is preferred that the plastic material be sufficiently transparent and of good optical quality to allow light transmission and detection through the bottom of the well (trans-illumination reading). Detection of the signal from excitation by a reflected light (epi-illumination reading) is also applicable.

FIGS. 1(a)–1(c) illustrate an $A^2$ plate in the form of a shallow multi-well microplate according to one embodiment of the present invention. As shown in FIG. 1(a) (top view) and FIG. 1(b) (cross-sectional view along the line A–A'), the $A^2$ plate 10 is formed of a tray 12, such as a molded tray, held at its edges by a rigid frame 14, such as a clam shell frame. The tray 12 is formed with an array of depressions or wells 16, which may be surface-treated for binding of biorecognition materials. FIG. 1(c) shows details of the clam shell frame that holds the tray at the edges. The tray may be clamped at all edges or some of the edges. Preferably, the tray is detachably mounted on the frame. This frame is preferably adapted for use with robotic tools such as the BIOMEK® Gripper Tool.

Figure 2B:
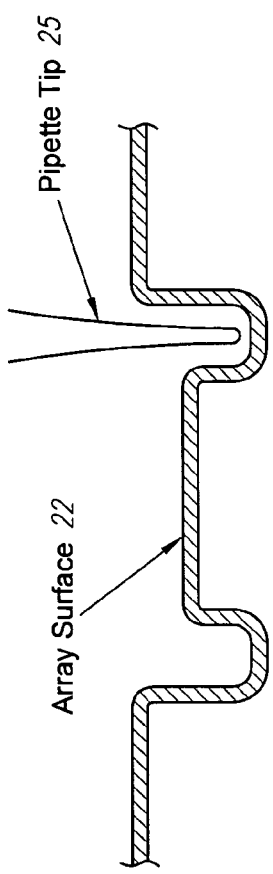

The plate may have any number of wells and any well pattern and geometry as needed for specific applications. For example, the entire tray may be one well; or a large number such as 2,000 or more small wells may be molded. In a preferred embodiment, the plate has an 8×12 array of 96 wells, each well being 6 mm in diameter and about 1 to 4 mm in depth, and the distance between wells is 9 mm center-to-center. In another embodiment shown in FIGS. 2(a) and 2(b), a plate having enhanced liquid handling ability is formed with a flat array formation area 22 surrounded by a peripheral depression 24. An array of microarrays 26 may be printed on the flat array formation area, and the sample may be added to the area and subsequently removed from the peripheral depression 24 with a pipette tip 25. This geometry provides a larger printing surface, enhances liquid handling ability by diverting the fluid away from the central flat area, and improves array imaging.

While the frame is formed of a rigid material for support, the tray is formed of a flexible material. Preferably, the tray is formed of a thermal formable polymer sheet, by vacuum forming or injection molding. In a preferred embodiment, the tray is formed of polypropylene and has a thickness of about 0.1 to 100 mils, preferably about 1 to 10 mils, a flexural modulus (ASTM D790) of about 170–220 Ksi, a Shore D hardness (ASTM D 2240) of about 65–80, and a deflection temperature at 66 Psi of about 100–200° F.

Figure 3A:
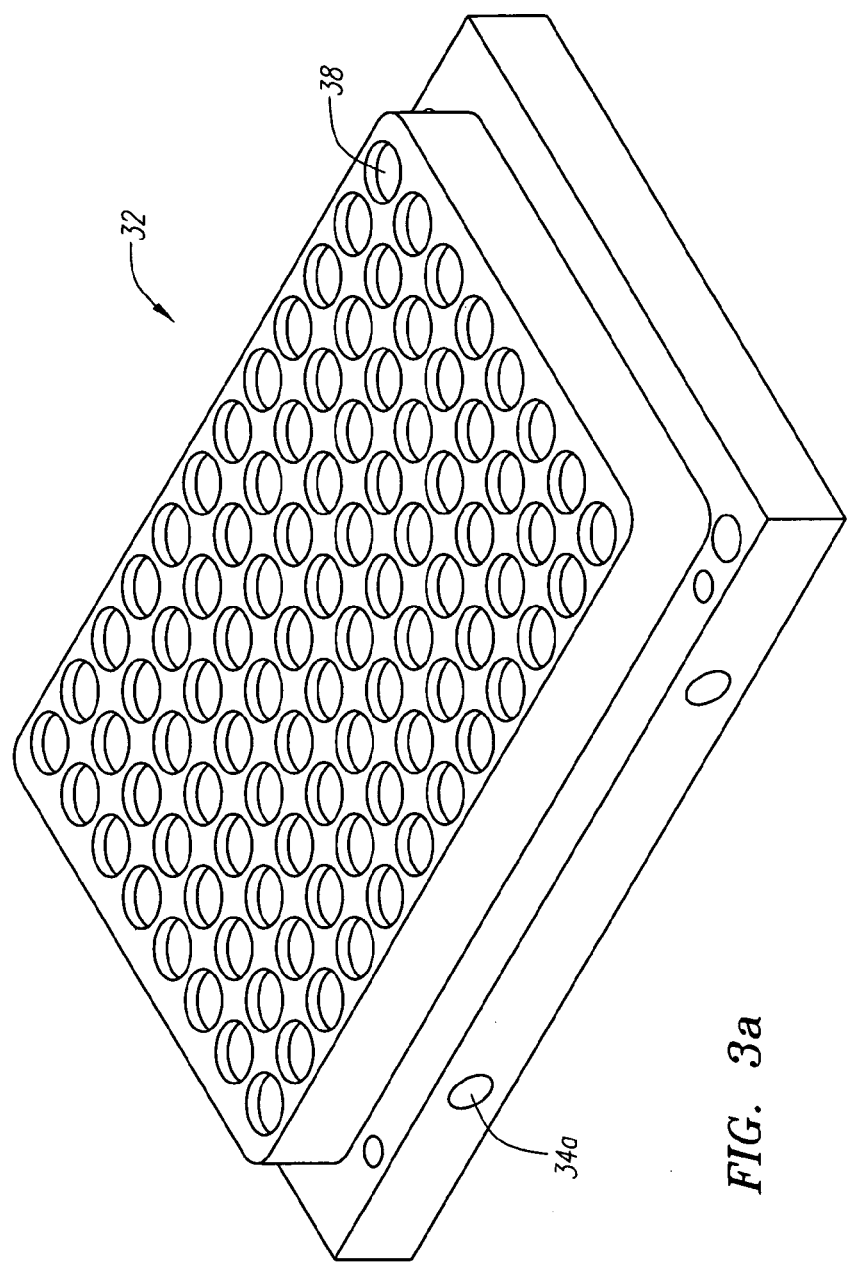
FIGS. 3(a), 3(b) and 3(c) are perspective views showing a vacuum fixture and an $A^2$ plate mounted thereon according to an embodiment of the present invention.
Figure 3B:
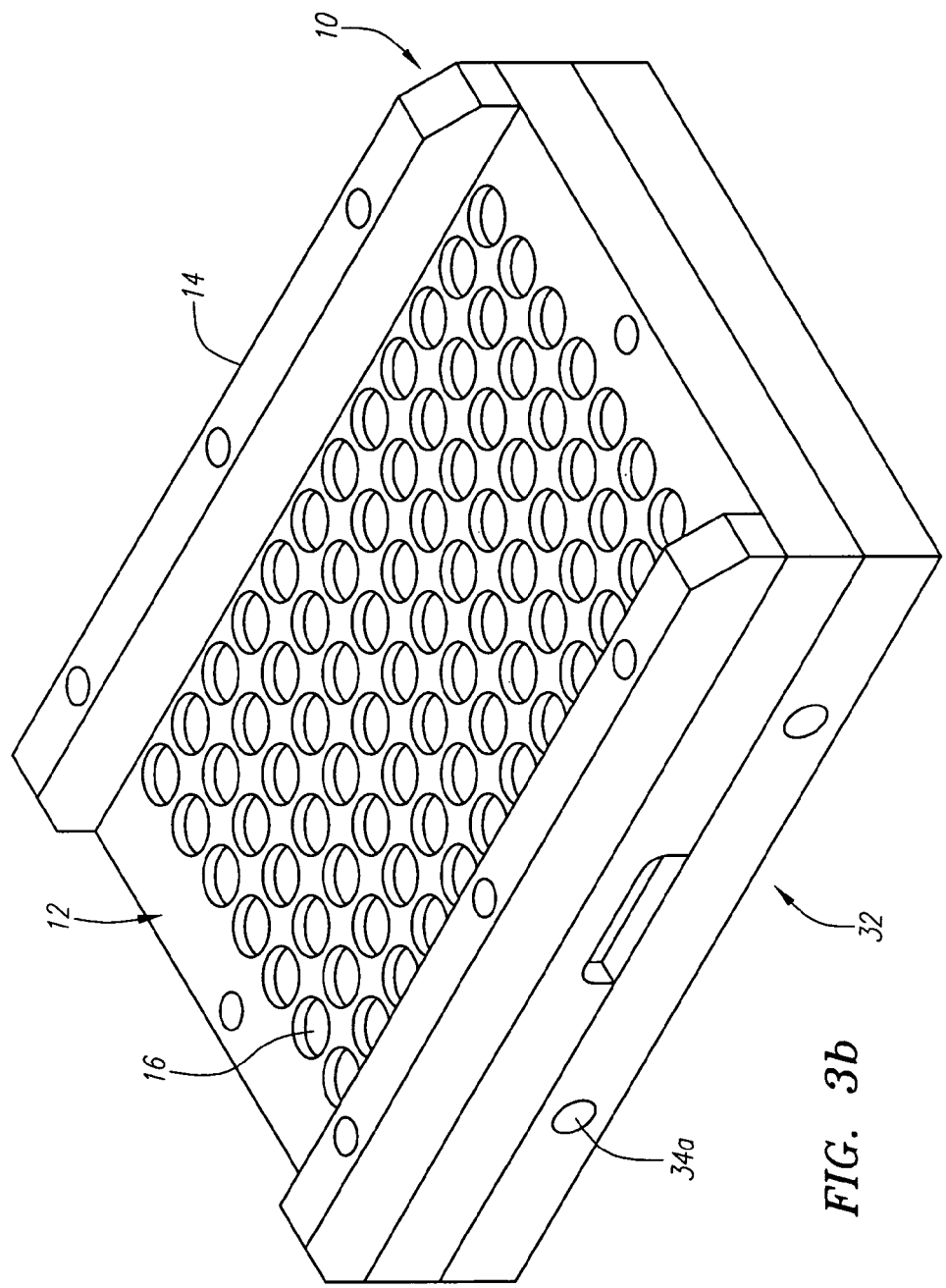
Figure 3C:
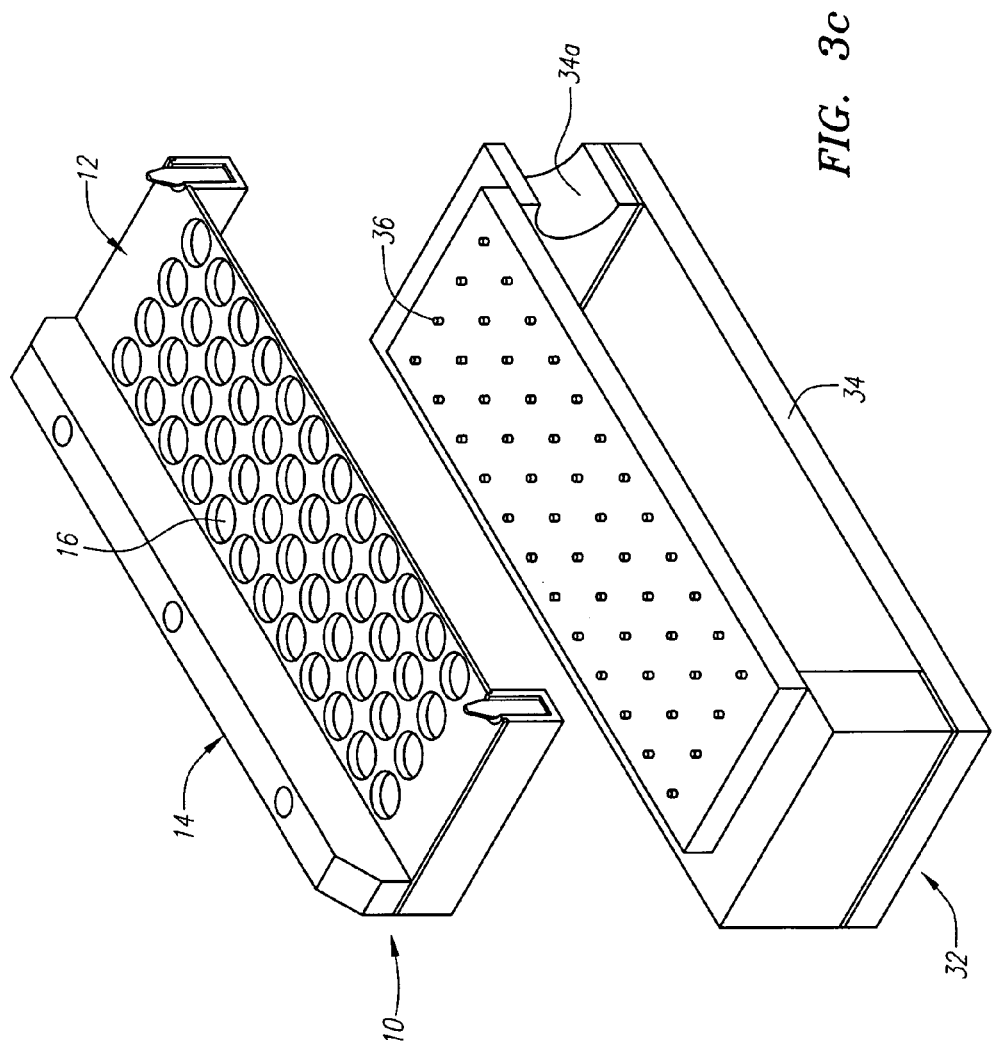
Figure 4:
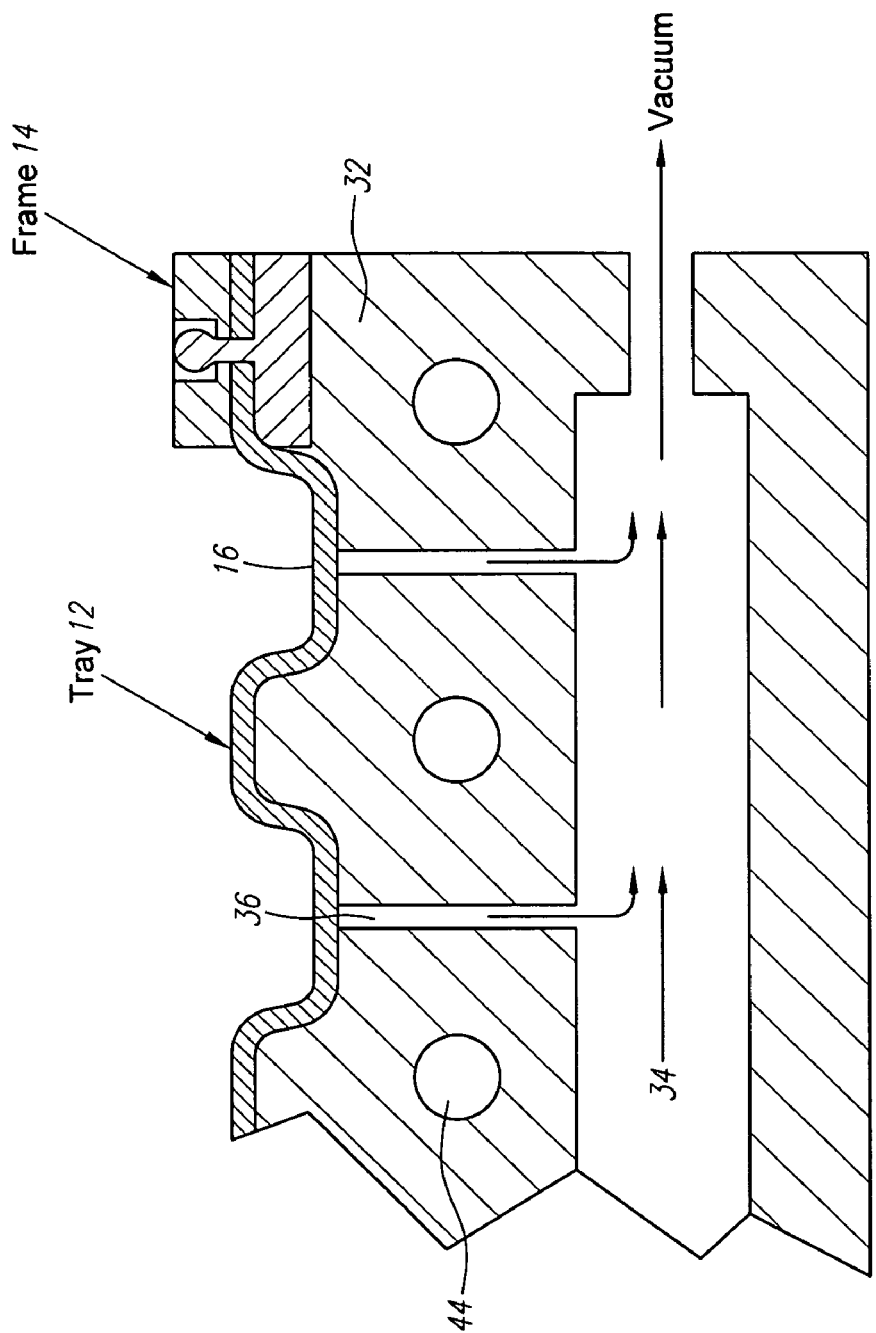
FIG. 4 is a cross-sectional view showing portions of a vacuum fixture and an $A^2$ plate mounted thereon.

During the microarray assay process, the $A^2$ plate is used in conjunction with a fixture apparatus such that when the plate is placed on the fixture, the bottom of each well is seated flat on the top surface of the fixture. The fixture apparatus is provided with various functions for different processing needs, such as maintaining a flat well bottom surface during microarray printing and data reading processes, controlling the well temperature and/or micromixing the well contents during heating, etc. FIGS. 3(a)–3(c) and 4 show an $A^2$ plate 10 and a vacuum fixture 32. As shown in FIG. 3(a), the top surface of the fixture 32 is formed with a plurality of depressions 38 having a shape complementary to the shape of the tray 12 of the $A^2$ plate 10, so that when the plate is mounted on the fixture (FIG. 3(b)), the wells 16 of the plate sit within the depressions 38 and the bottom of each well is flat against the bottom of the depression. FIG. 3(c) shows an alternative embodiment in which the top surface of the fixture 32 is flat and the bottom of the wells 16 are placed against the flat surface when the plate 10 is mounted on the fixture. As shown in FIGS. 3(b) and 3(c), the frame 14 of the $A^2$ plate is shaped to be mounted on the fixture so that the tray 12 rests on the top surface of the fixture. The fixture in turn mounted on various processing apparatuses such as printing machine, incubator, etc. as described later.

The fixture 32 has an interior chamber 34 connectable to a vacuum source (not shown) via channels 34a, and a plurality of orifices 36 located on the top surface and connected to the interior chamber 34. The orifices 36 are located within the depressions 38 in the embodiment of FIG. 3(a), or at locations corresponding to the bottom of the wells 16 in the embodiment of FIG. 3(c). When a vacuum is drawn in the interior chamber 34, the vacuum is communicated via the orifices 36 to create a negative pressure to hold the bottom of the wells 16 firmly against the top surface of the fixture 32. As a result, even though the tray 12 is formed of a flexible material, the bottom portions of the wells 16 maintain a high precision flatness to facilitate high-resolution printing and reading of the microarrays. The flatness of the well bottom is generally determined by the flatness of the depressions 38 or the top surface of the fixture corresponding to the bottom of the wells. A high degrees of flatness of less than 0.0001-inch variation across the tray may be obtained.

Temperature control abilities may be provided to the vacuum fixture 32 by providing a plurality of channels 44 in the fixture to pass a temperature-controlled fluid. Alternatively, temperature control may be achieved by using a resistance heater, or by using a layer of solid state thermoelectric material such as a Peltier type material disposed between the surface of the fixture and the tray to provide cooling. In a temperature-control fixture, the orifices 36 function to remove air from between the bottom of the well and the surface of the fixture to reduce the thermal resistance between the fixture 32 and the tray 12. This ensures uniform temperature control for the wells.

Figure 5B:
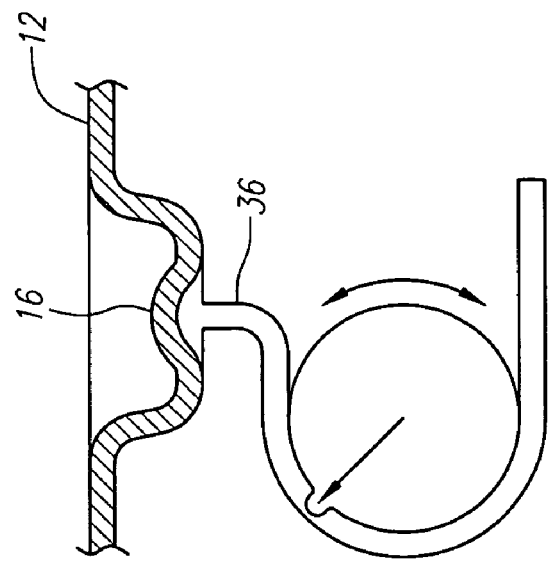
FIGS. 5(a) and 5(b) illustrate the micromixing action of a vacuum fixture.
Figure 5A:
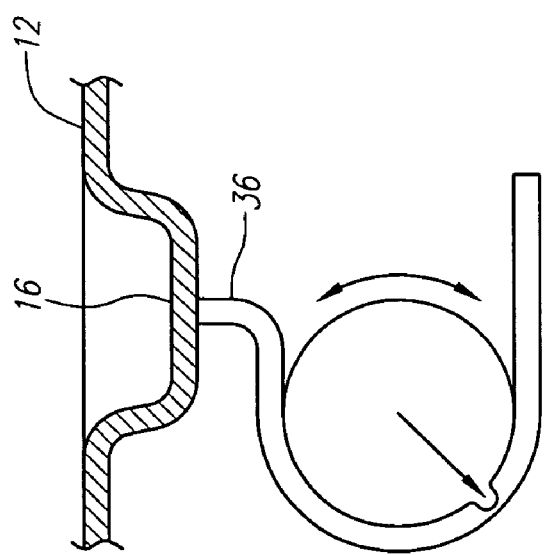

In addition, the vacuum fixture may be provided with a micromixing capability by connecting the vacuum chamber 34 to a peristaltic pump which generates alternating positive and negative pressures. As shown in FIGS. 5(a) and 5(b), the alternating pressures are communicated by the orifice 36 to the space between the surface of the fixture 32 and the bottom of the well 16, causing the flexible bottom portion of the well to be alternately pushed up and pulled down. This creates a micromixing effect to uniformly mix the solution held in the well.

The physical dimensions and properties of the $A^2$ plate and the fixture apparatus may be selected so that they are adapted for working with existing or future microarray assay devices. For example, the plate may be designed to conform to operation on the Biomek series Workstation Platforms or similar robotic liquid handlers. The outside linear dimensions of the $A^2$ plate may be made to conform to a standard microtiter plate footprint with a rigid frame, conventionally used in automated assays in which the microplate is moved from one location to another on the workstation and/or its peripheral networked devices. In addition, the wells of the $A^2$ plate are sufficiently shallow (such as less than 4 mm deep) with a side draft that allows for within well reading of individual wells by a CCD camera or other detector system. Specific properties of the plastic tray material such as thickness, tensile strength, elongation and elasticity modulus shear strength, flatness, heat capacity, solvent and water adsorption properties, well shape, etc. are selected in order for the $A^2$ plate to deliver optimal performance when used with particular fixture apparatus and assay devices. For example, if the mixing fixture is to be used, the material is selected so that the $A^2$ plate is capable of flexing up and down by the action of the peristaltic pump.

Figure 6:
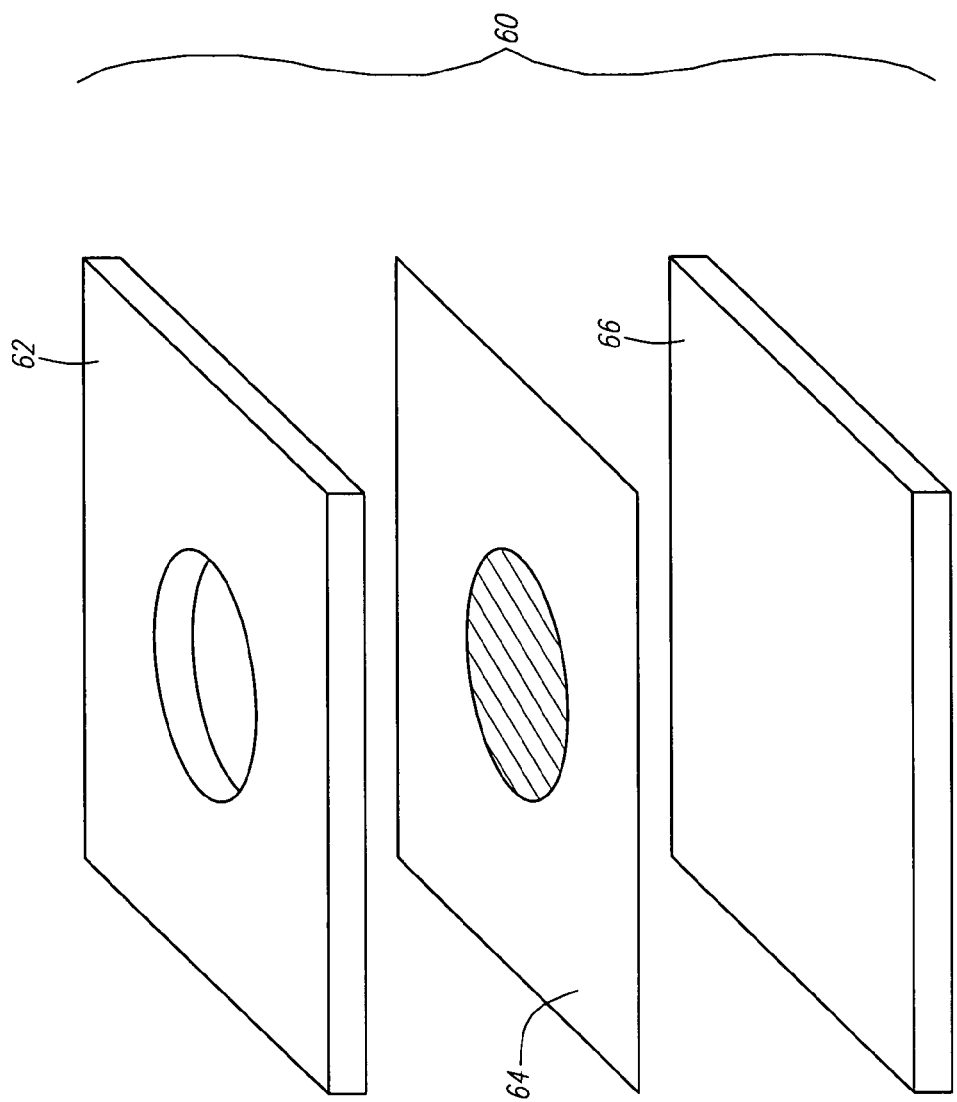
FIG. 6 illustrates the construction of a $A^2$ plate according to another embodiment of the present invention.

FIG. 6 illustrates the construction of an $A^2$ plate 60 according to another embodiment of the present invention. A microwell is formed using a dye cut gasket 62 is sealed to an activated plastic substrate 64 containing a microarray of biorecognition materials. Optionally, the plastic substrate 64 is attached to a stiff support plate 66 to provide strength. The gasket 62, the plastic substrate 64 and the support plate 66 are held together, such as by using adhesive, sonic welding, compression fitting or vacuum forming, to form a shallow well microplate. Only one well is shown in the FIG. 6 to illustrate the construction of the plate, but the plate typically comprises multiple microwells such as 96 or 384 microwells. Similar to the earlier embodiments, the $A^2$ plate 60 may be used with a vacuum fixture device.

The $A^2$ plate may also be provided with a lid, such as a vacuum clamped lid, to control the micro environment of the wells for cell culturing or sensitive assay development, such as to reduce contamination, retard evaporation, prevent condensation, and/or provide temperature control. The lid may also be designed to allow for cell culturing, by providing both temperature control and ports for gas exchange over the liquid in the well to maintain partial gas pressure and pH control needed for cell growth. One embodiment of a lid is illustrated in FIGS. 7(a), 7(b) and 7(c). FIG. 7(a) illustrates a lid and a tray. FIG. 7(b) shows the lid fitted on to the tray. FIG. 7(c) illustrates the structure of a well cap.

As shown in these figures, the microplate lid 71 is formed of connected or adjoined units of well caps 72. Each well cap 72 may be provided with a gas inlet port 72a, a gas outlet port 72b, a gas diffusion member 72c disposed on the inside of the cap and covering the gas inlet and/or the gas outlet port. The gas diffusion member 72 may be a membrane, foam or other media, and may be either permeable to allow free diffusion of gases, or semipermeable to fluids or specific gases. Additional ports 72d may be provided. The well cap 72 may also be provided with heating or cooling elements 72e such as Peltier devices or coils, tapes or other conductive materials. The lid is fitted over the microplate 73 so that each well cap 72 covers a well 74 of the microplate. Preferably, the microplate 73 is formed such that slots 75 are provided between wells, and the lid 71 is formed such that the well caps have downwardly protruding portions that fit into the slots around the side walls of the wells. In this configuration, the heating elements 72e may be disposed in the downwardly protruding portions to provide uniform temperature control (FIG. 7(c)). The microplate lid may be placed manually over the microplate or seated with the aid of a robotic arm or similar devices. The capped microplate may then be seated upon an $A^2$ plate fixture 32 for use on a robotic liquid handling work station.

A typical use of the microplate and lid would be in automated culturing of cells within the $A^2$ plate. Culture media is placed in the uncapped microplate using a robotically controlled pipetting tool. The lid is picked up by a robotic arm and seated onto the plate. A carbon dioxide-air mixture is delivered to individual wells through the gas port until the desired dissolved gas equilibrium is reached. Likewise, temperature is adjusted using the described heating and cooling system. A cell innoculum is introduced either through the additional port 72d located on the well cap or by briefly removing the lid and pipetting in the innoculum. The micro-environment of the cultures is returned to its earlier state and culturing is commenced.

Figure 8A:
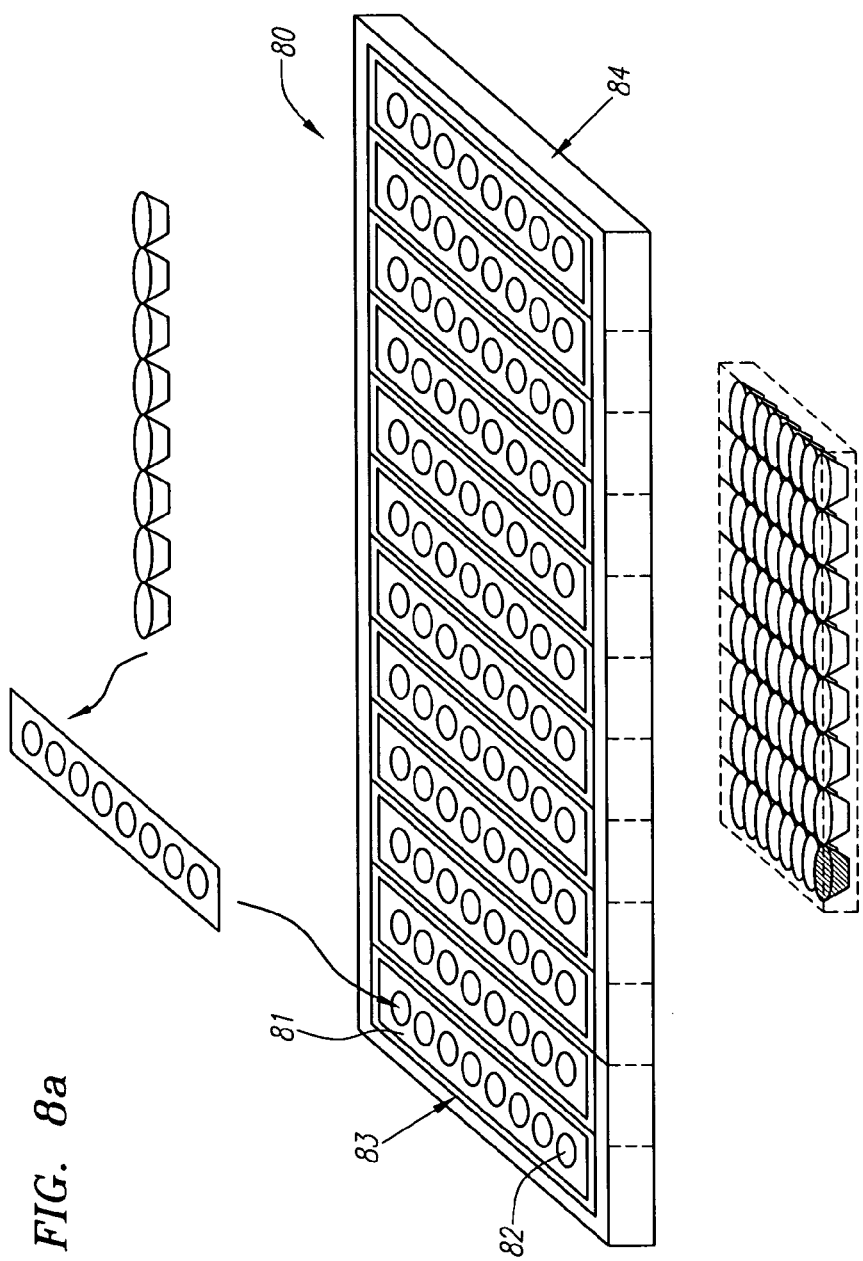
FIG. 8(a) illustrates an $A^2$ plate formed of separate strips of wells according to another embodiment of the present invention.

According to another embodiment of the present invention shown in FIG. 8(a), an $A^2$ plate 80 is formed of a plurality of flexible strips 81 each comprising a plurality of wells 82 arranged in one or more rows. The strips may be formed of a flexible plastic material by molding or vacuum forming, and they may be separated formed or sectioned into strips from a previously formed plate. Each flexible well strip 81 is press-fitted into a rigid plastic hanger 83, which is in turn mounted on a rigid plastic frame 84.

Figure 8B:
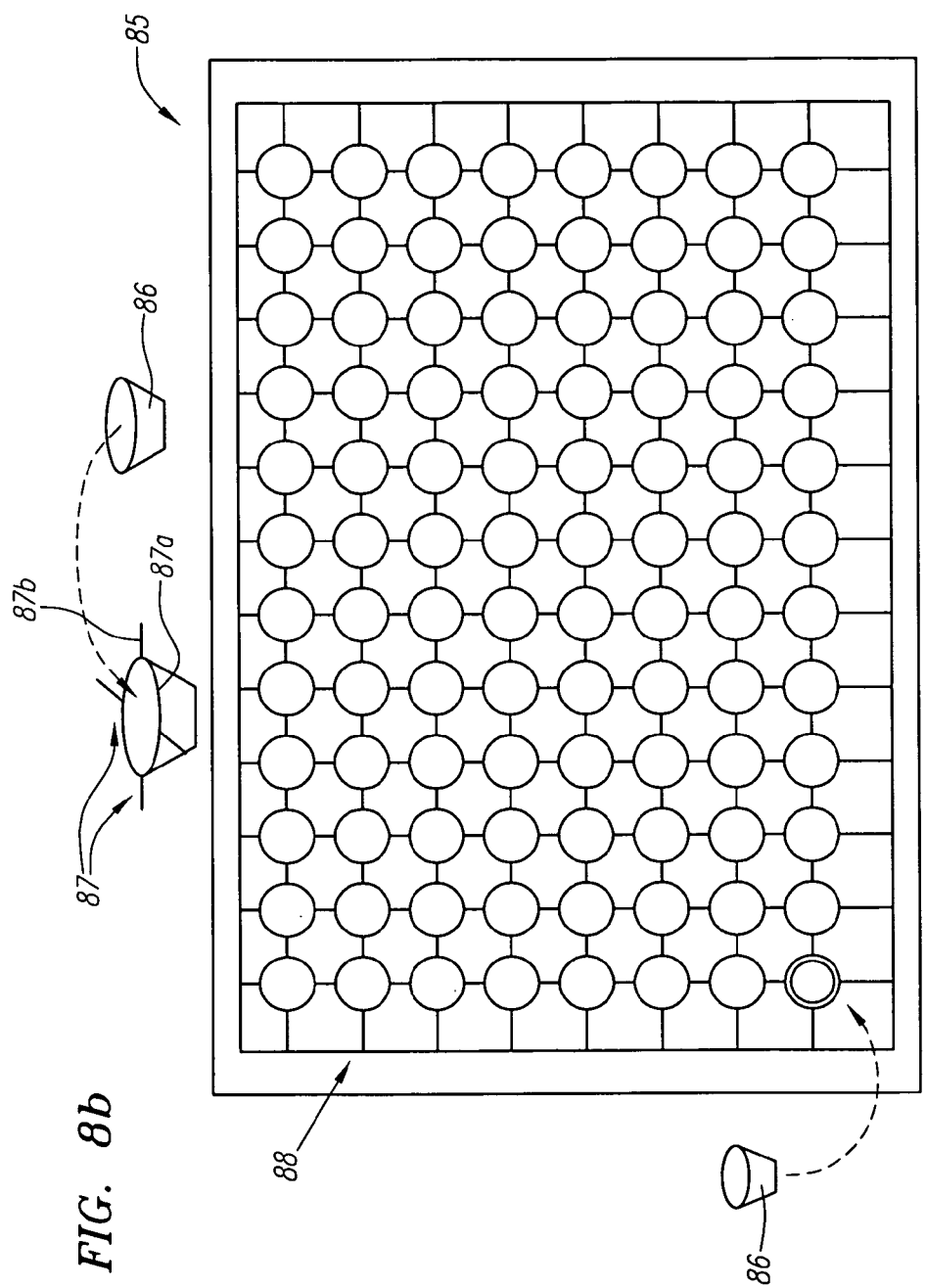
FIG. 8(b) illustrates an $A^2$ plate formed of separate wells according to yet another embodiment of the present invention.

According to yet another embodiment shown in FIG. 8(b), an $A^2$ plate 85 may be formed of individual molded or vacuum-formed plastic wells 86 fitted into a rigid plastic hanger 87 comprising a ring 87a and crossbars 87b. The series of hangers 87 are linked together and to a frame 88 of rigid plastic. The plates according to the embodiments shown in FIGS. 8(a) and 8(b) allows a single well or a group of wells on a plate to be handled separately and increases the versatility of the device.

The $A^2$ plates according to embodiments of the present invention may be used as consumables on specialized workstations such as the Biomek line of liquid handling robots. The plates may be pre-printed with arrays of probed in the wells or unprinted.

Figure 9:
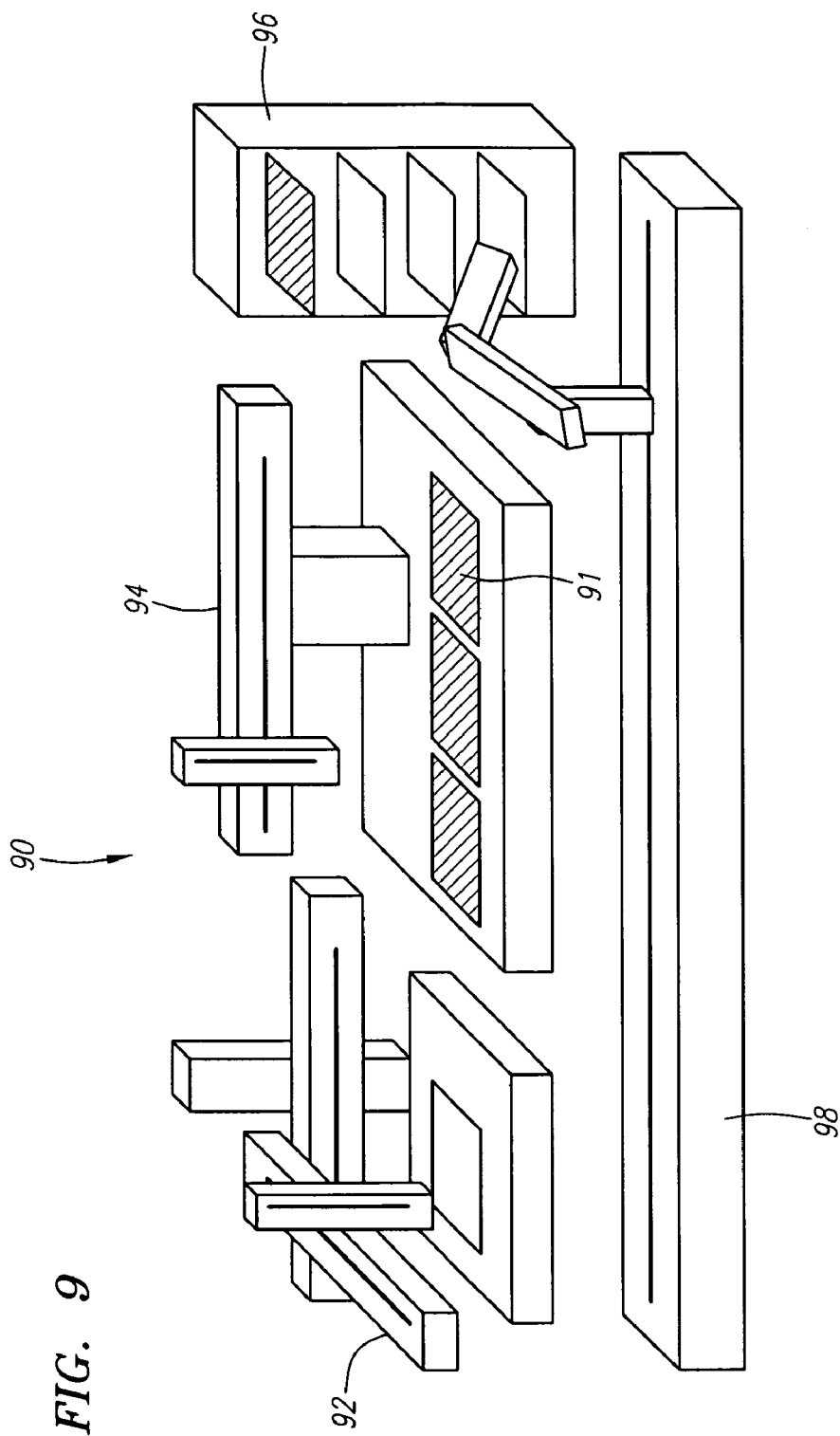
FIG. 9 schematically shows a microarray assay system.

The application of the $A^2$ plate and the fixture apparatus in the microarray assay system and process is described with reference to FIG. 9. The microarray assay system 90 includes the following modular units: a microarray printer 92, a robotics workstation 94 such as Biomek robotic station, a hybridization hotel 96, and transport system 98 such as an ORCA® arm and slide rail. The various modular units have been used in microarray assay systems that use conventional glass slide microarrays or conventional multi well assays, and may be adapted to work with the $A^2$ plate and fixture apparatuses. The printer 92 is used to print microarrays of probes such as cDNA, oligo, protein, etc. onto the array of arrays microplate 91. When printing, the $A^2$ plate is positioned on the vacuum fixture and the vacuum is drawn. An array spotter, such as Cartesian's BioDot Arrayer, deposits an array of probes inside each well. Arrays of many hundreds of probes can be printed. After printing, the microplate is transported either to the robotic workstation 94 for processing of samples under automated hybridization or incubation, or transferred to the hybridization hotel 96 for storage. For hybridization and incubation, samples and reagents are deposited into the microplate on the robotic workstation 92. A fixture having temperature control and/or micromixing capabilities may be used for this process. After the microplate is prepared for hybridization or incubation, it is transferred using the transport system 98 to the hybridization hotel 96, where hybridization of the probes and targets (for cDNA arrays), or incubation (for protein arrays) is allowed to proceed. The hybridization hotel 96 is a high-capacity incubator that provides a programmable humidity and temperature control. Upon completion of hybridization or incubation, the plate is removed from the hotel 96 and returned to the workstation 94 for further processing such as imaging. During this process, the plate is rinsed and signal development reagents dispensed into the wells; subsequently, the plate is again rinsed and either returned to the hotel for storage or transferred to a reading station.

Such microarray assay system completely automates the assay process and increases throughout. Standard protocols can be written for the automatic handling process, and variations inherent in manual processing is removed.

Figure 10:
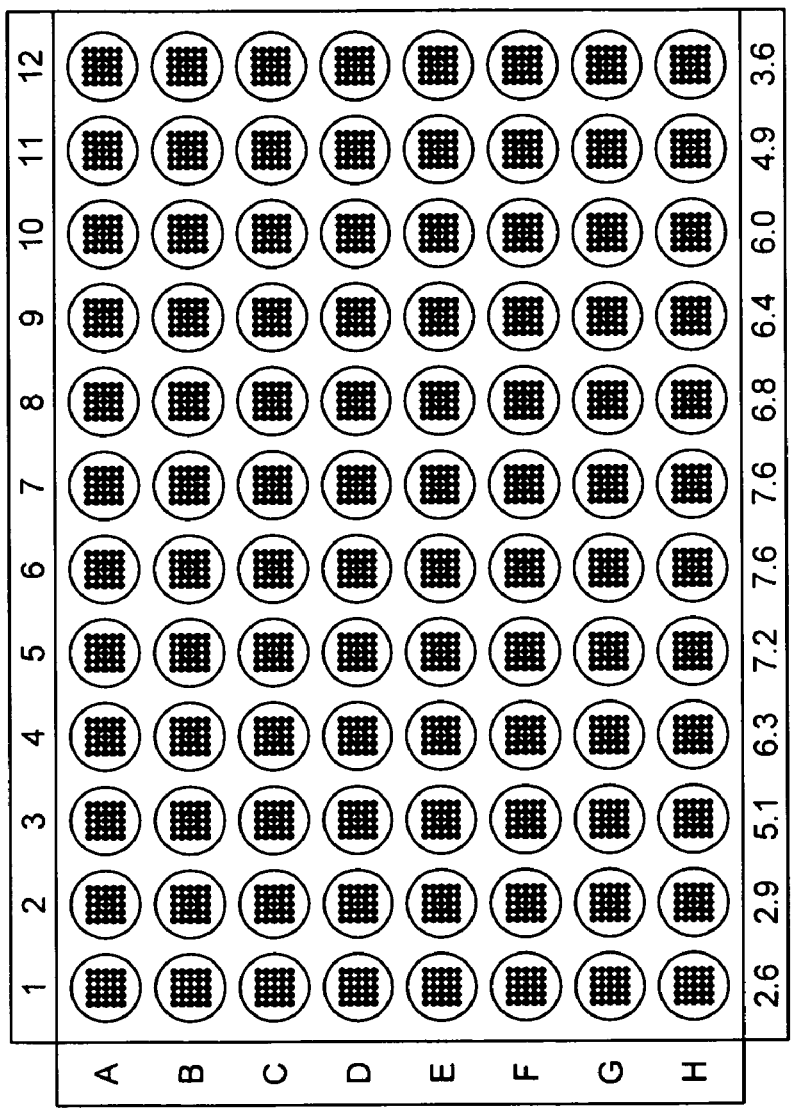
FIG. 10 is an image representative of data obtained using the microarray assay system.

FIG. 10 presents an image representative of data obtained using the microarray assay system according to embodiments of the present invention. Human IgG replicate spots were printed in 5×5-spot arrays in the bottom of the wells of a 96-well $A^2$ plate, with a total of 2400 spots per plate. The $A^2$ plate was vacuum-formed from a 10 mil polypropylene sheet material and surface activated with acyl fluoride groups to which the antigen (Hu IgG) was covalently attached. Biotinylated mouse anti-Hu IgG with streptavidin-Alkaline Phosphatase/ELF fluorescent substrate was used for signal development. The overall coefficient of variation of the plate was about 9.7%.

In summary, the microarray assay system of the present invention provides significantly higher throughput as compared to the conventional systems using treated glass slides as array substrate. While the glass slides are a commodity and meet the flatness criteria, it is tedious and time-consuming to process, store and catalog hundreds and thousands of slides generated each month in many molecular biology labs. Also, each glass slide has a glass cover slip that must be applied and removed by hand. The A plate, on the other hand, allows many samples to be processed with one plate. The plates can be bar code labeled for tracking. The microarray assay system also minimizes variations in critical parameters in the printing, hybridization and imaging of microarrays, thereby improving repeatability of the assay. Performance metrics obtained from the microarray assay system of the present invention is equivalent to or better than existing microarrays, with specificity of 1:200,000 cells or better, dynamic range of 3 logs or better, and a coefficient of variation of less than 10% array to array. The invention may be used in gene expression, SNP's, immunoassays, cell assays, etc.

It will be apparent to those skilled in the art that various modifications and variations can be made in the microarray assay system of the present invention without departing from the spirit or scope of the inventions. Thus, it is intended that the present invention cover modifications and variations of this invention that come within the scope of the appended claims and their equivalents.

What is claimed is:

1. An assembly for a microarray assay device, comprising:
   a microplate having a plurality of discrete array formation areas each formed of a flexible material and activated for immobilization of biorecognition materials, and barriers formed between the array formation areas to restrict fluid cross-flow therebetween; and
   a vacuum fixture defining a top surface and an interior chamber connectable to a vacuum source, wherein the microplate is mounted on the top surface of the vacuum fixture so that the array formation areas conform to the top surface of the vacuum fixture, the vacuum fixture defining a plurality of orifices connected to the interior chamber and opening at the top surface at locations corresponding to the array formation areas when the microplate is mounted on the top surface of the vacuum fixture, wherein each of the orifices connects directly to both the top surface and the interior chamber, wherein each of the orifices are directly below the array formation areas, wherein there is no fluid communication between the array formation areas and the orifices.

2. The assembly of claim 1, wherein the barriers are walls formed of the flexible material, hydrophobic patches, troughs, gaskets, or pedestals formed between the array formation areas.

3. The assembly of claim 1, wherein the barriers have a height of less than about 4 mm.

4. The assembly of claim 1, wherein the microplate comprises a tray formed of the flexible material, the tray having a plurality of discrete wells formed therein, each well containing an array formation area at its bottom, wherein the bottom of each well is supported on the top surface of the vacuum fixture.

5. The assembly of claim 1, wherein the microplate comprises a tray formed of the flexible material, the tray having a peripheral depression surrounding one or more array formation areas.

6. The assembly of claim 1, wherein the microplate comprises a support plate, a flat substrate formed of the flexible material disposed over the support plate, and a gasket defining a plurality of holes, the gasket being disposed over the substrate and sealed thereto, where each area of the substrate exposed by a hole of the gasket contains an array formation area.

7. The assembly of claim 1, wherein the microplate further comprises a rigid frame detachably attached to the flexible material, wherein the rigid frame is adapted for mounting the microplate on the top surface of the vacuum fixture.

8. The assembly of claim 7, wherein the microplate further comprises a plurality of rigid hangers, and a plurality of well strips formed of the flexible material, each well strip being pressed-fitted into a rigid hanger, each well strip containing one or more of the discrete array formation areas.

9. The assembly of claim 1, further comprising a plurality of microarrays of biorecognition materials, each microarray being formed within the array formation area.

10. The assembly of claim 9, wherein the biorecognition materials include biomolecules, cells or cellular components.

11. The assembly of claim 9, wherein the biorecognition materials are labeled.

12. The assembly of claim 9, wherein each array contains from 1 to 1536 elements of biorecognition materials.

13. The assembly of claim 1, wherein the array formation areas are activated for immobilization of biorecognition materials by covalent interaction, noncovalent interaction or affinity interaction.

14. The assembly of claim 1, where the array formation areas are activated by direct surface treatment, placement of activated inserts, or adsorption of an activated coating to surface of the array formation areas.

15. The assembly of claim 1, wherein the flexible material is a thermal formable polymer material and the microplate is formed by vacuum forming or injection molding.

16. The assembly of claim 1, wherein the flexible material has a thickness of about 0.1 to 100 mils.

17. The assembly of claim 16, wherein the flexible material has a thickness of about 1 to 10 mils.

18. The assembly of claim 1, wherein the flexible material has a flexural modulus of about 170–220 Ksi, a Shore D hardness of about 65–80, and a deflection temperature at 66 Psi of about 100–200° F.

19. The assembly of claim 1, further comprising a lid formed of a plurality of caps each corresponding to the array formation area.

20. The assembly of claim 19, wherein each cap comprises a gas inlet port, a gas outlet port, and a gas diffusion member disposed on an inside of the cap.

21. The assembly of claim 20, wherein each cap further comprises a temperature control element.

22. An assembly for a microarray assay device, comprising:
   a microplate having a plurality of wells formed of a flexible material and having continuous flat bottoms; and
   a vacuum fixture defining a top surface and an interior chamber connectable to a vacuum source, wherein the microplate is mounted on the top surface of the vacuum fixture so that the bottom of each well conforms to the top surface of the vacuum fixture, the vacuum fixture further defining a plurality of orifices connected to the interior chamber and opening at the top surface at locations corresponding to the bottoms of the wells when the microplate is mounted on the top surface of the vacuum fixture, wherein each of the orifices connects directly to both the top surface and interior chamber, wherein each of the orifices is directly below the wells, wherein there is no fluid communication between the wells and the orifices.

23. The assembly of claim 22, wherein the vacuum fixture further comprises a temperature control device for controlling the temperature of the top surface of the vacuum fixture.

24. The assembly of claim 23, wherein the temperature control device includes a plurality of channels formed in the vacuum fixture in the vicinity of the top surface for passing a temperature trolled fluid.

25. The assembly of claim 22, further comprising a peristaltic pump connected to the interior chamber for generating an alternating positive and negative pressures within the interior chamber, whereby the alternating positive and negative pressures are conducted by the orifices to the top surface of the vacuum fixture at locations corresponding to the bottoms of the wells to create a micromixing effect in the wells.

26. The assembly of claim 22, wherein each well containing an array formation area at its bottom.

27. The assembly of claim 22, wherein the microplate further comprises a rigid frame detachably attached to the flexible material, wherein the rigid frame is adapted for mounting the microplate on the top surface of the vacuum fixture.

28. A microarray assay method, comprising:
providing an assembly for a microarray assay device according to claim 1;
mounting the microplate on the top surface of the vacuum fixture;
generating a negative pressure in the orifices to hold the array formation areas against the top surface of the fixture; and
while holding the array formation areas against the top surface of the fixture, performing at least one function selected from the group consisting of: printing a microarray of biorecognition materials in an array formation area, adding a sample to an array formation area, controlling the temperature of any sample added in the array formation area, and imaging an array formation area.

29. A microarray assay method, comprising:
providing an assembly for a microarray assay device according to claim 1;
mounting the microplate on the top surface of the vacuum fixture;
adding at least one sample to at least one array formation area; and
generating alternating positive and negative pressures in the orifices to move the array formation areas up and down to mix the sample.

30. The method of claim 29, wherein at least one array formation area contains an array of immobilized biorecognition materials.

31. The method of claim 30, wherein the biorecognition materials are labeled.

32. The method of claim 30, wherein the sample is labeled.

* * * * *